United States Patent [19]

Holodak et al.

[11] Patent Number: 5,305,002
[45] Date of Patent: Apr. 19, 1994

[54] HINGED READ-OUT ANTENNA SYSTEM

[75] Inventors: George Holodak, Houston, Tex.; Loek D'Hont, Almelo, Netherlands

[73] Assignee: Texas Instruments Incorporated, Dallas, Tex.

[21] Appl. No.: 824,417

[22] Filed: Jan. 23, 1992

[30] Foreign Application Priority Data

Jan. 23, 1991 [NL] Netherlands ............... 9100111

[51] Int. Cl.$^5$ ............................... H01Q 7/08
[52] U.S. Cl. .................... 343/788; 343/741; 340/572
[58] Field of Search ............... 343/741, 788, 866, 867, 343/895, 856, 868, 871, 879, 758, 762; 340/505, 572

[56] References Cited

U.S. PATENT DOCUMENTS

| | | | |
|---|---|---|---|
| 2,553,295 | 11/1948 | Bock | 343/882 |
| 3,754,226 | 8/1973 | Fearon | 343/788 |
| 3,868,669 | 2/1975 | Minasy | 340/280 |
| 4,384,281 | 5/1983 | Cooper | 343/788 |
| 4,570,165 | 2/1986 | Tsurumaru et al. | 343/726 |
| 4,679,046 | 7/1987 | Curtis et al. | 343/867 |
| 5,084,699 | 1/1992 | DeMichele | 343/867 |

FOREIGN PATENT DOCUMENTS 0141070 5/1985 European Pat. Off. .
WO86/02186 4/1986 PCT Int'l Appl. .

*Primary Examiner*—Donald Hajec
*Assistant Examiner*—Tan Ho
*Attorney, Agent, or Firm*—Rebecca A. Mapstone; James C. Kesterson; Richard L. Donaldson

[57] ABSTRACT

A novel antenna system disposed around a conveyor belt for the interrogation of objects passing through the antenna which overcomes centralized dead zone problems is disclosed. A frame antenna which is disposed around the conveyor belt achieves the interrogation and a separate reading antenna, which is disposed hingedly from the top of the frame antenna performs the reception.

9 Claims, 1 Drawing Sheet

HINGED READ-OUT ANTENNA SYSTEM

FIELD OF THE INVENTION

The invention relates to an antenna system for an interrogating station for the interrogation and identification—using high-frequency signals—of an object which is provided with a transponder and which is moved along an interrogation path, such as a conveyor, which antenna system is operable for transmitting interrogation signals and for receiving and identification code transmitted by the transponder. Such an antenna system is known in practice.

BACKGROUND OF THE INVENTION

Through such an interrogation station, the transponders fitted on the objects are illuminated or charged by means of high-frequency interrogation signals. Such a transponder is generally a passive transponder in which, on the basis of the charge produced by the electromagnetic field, a transmission of its own identification code then takes place. The antenna system used can have the function of transmitting or interrogating antenna and the function of receiving antenna for receiving or reading the identification code. The antenna can be in the form of a frame antenna which is fitted around a conveyor belt, but which as regards to reading of the transponders, has one or more dead zones for certain transponder antenna orientations. For example, there lies a dead zone across the very center of the conventional frame antenna. If a transponder is located within a window which is parallel to the belt and comprises some distance on either side of the center frame axis, and maintains this position throughout the read area of the antenna, the transponder would not be read. Moreover, the accuracy and completeness of this reading also decreases if several transponders are following one another in close succession during the movement along. When transponders are in close succession, because they are relatively far from the read antenna, the transponders appear to be the same distance from the read antenna and thus send back simultaneous transmissions. The result of a simultaneous transmission is an unintelligible identification code. This is particularly the case in a noisy environment, for which a shielding would then be necessary in receiving conditions.

SUMMARY OF THE INVENTION

The object of the invention is to eliminate the above-mentioned problems and to indicate an antenna system by which both the illumination and the reading are achieved with great accuracy.

This is achieved in the case of an antenna system of the type mentioned in the preamble, in that for the interrogation, a frame antenna is disposed around the conveyor, and for the reception a separate reading antenna is provided, having a hinged suspension at the top side of the frame antenna.

This design with the reading antenna in the center or near the center of the frame face produces a reading radiation pattern through which the aforementioned dead zone otherwise occurring in the center is avoided and problems with the reading of transponders following each other in close succession are also eliminated.

BRIEF DESCRIPTION OF THE DRAWINGS

The invention will be explained in greater detail with reference to an example of an embodiment shown in the drawings, in which.

DESCRIPTION OF THE PREFERRED EMBODIMENTS

Figure 1:
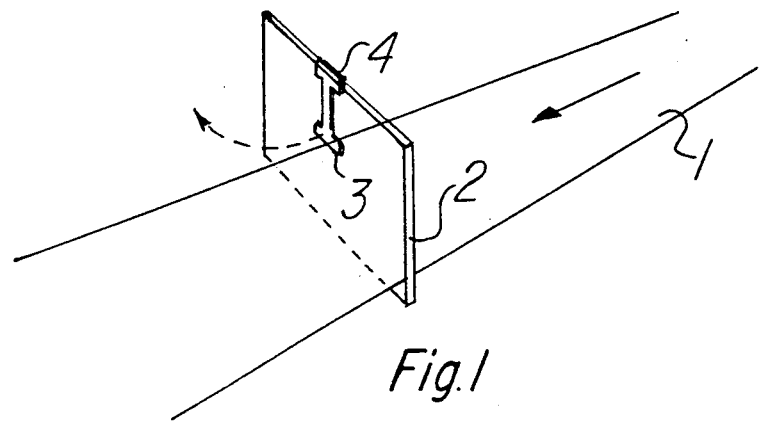
FIG. 1 shows a schematic view of a frame antenna disposed around a conveyor belt, and having a separate reading antenna hingedly suspended from it.

FIG. 1 shows schematically the arrangement of a frame antenna 2 which is disposed around a conveyor belt 1 and is intended for interrogating and identifying objects transported by the conveyor. These objects can be pieces of luggage each provided with a passive transponder. If the frame antenna have both the function of illuminating or charging the transponders and that of receiving or reading the identification code transmitted by these transponders, it will be clear that for certain transponder orientations dead zones can occur in particular along the center frame axis. This problem of incomplete or poor reading occurs in particular when transponders are moved along in the center of the interrogation path in close succession. In order to eliminate this problem, it is possible, as in the copending Netherlands Dutch Patent Application No 9100110, to use several receiving antennae which are disposed equally around the periphery of the frame antenna.

However, according to the invention, another way is followed and use is made of a separate receiving antenna 3 which is suspended hingedly at the top side of the frame antenna 2 in such a way that, on the approach of the objects, it can be moved away as indicated by the dashed line in FIG. 1. As the antenna moves away, the reading radiation pattern moves as well, thereby encompassing a much greater read area than would a stationary antenna. In this way a dead-zone free read area is established wherein every transponder orientation can be read. The separate hinged receiving antenna also solves the problem of trying to read a close succession of transponder antennas by hanging in the midst of the objects to be read such that a more real distance between transponders is achieved and only one transponder at a time will respond.

The antenna coil can have several windings which are embedded, for example, in a plastic disc. This disc is suspended at the top side of the frame antenna by means of a plastic carrier in which or on which the antenna coil connection wires are accommodated. The hinged fastening 4 at the top side can be designed in different ways. This arrangement of the separate reading antenna ensures a good reading of the transponders, with the avoidance of dead zones. The separate reading antenna can in this case be arranged in such a way that it is suspended approximately in the center of—or a little above—the frame face.

Figure 2:
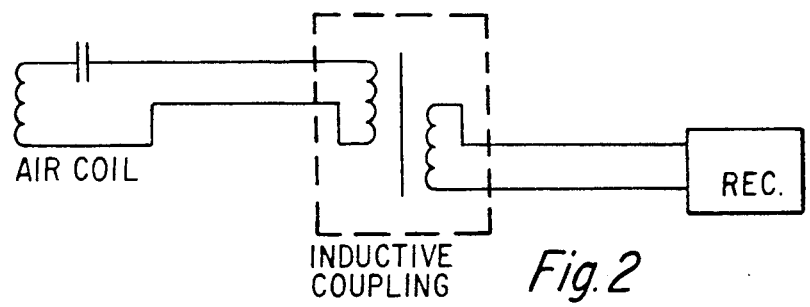
FIG. 2 shows a general electrical diagram of the reading antenna of FIG. 1, with associate connections.

FIG. 2 shows an electrical diagram of the hinged coupling with the connections at one side to the receiving or reading antenna in the form of an air-core coil and at the other side to the receiver in the transmit-receive unit of the interrogating station. The embodiment shown in FIG. 2 comprises an inductive or contactless coupling with two coils, one of which is fixed, while the other is movable or hinged. The advantage is that no fatigue of connecting wires occurs, as in the case of an galvanic connection.

Figure 3:
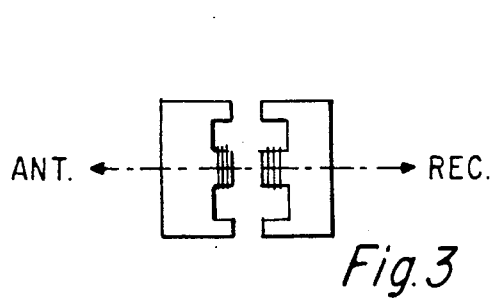
FIG. 3 shows a sectional view of a pot core design of the hinged suspension.
Figure 4:
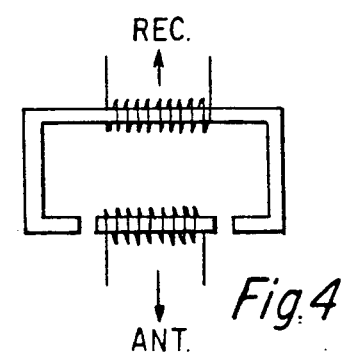
FIG. 4 shows an example of a variant.

FIG. 3 gives a cross-sectional view of this inductive and contactless coupling of FIG. 2. In order to make the magnetic coupling larger, two pot cores are used in said inductive coupling, one of which is fixed to the top side of the frame antenna, while the other can move along it rotating about the same longitudinal axis as that of the fixed pot core. As indicated, each pot core is provided with a coil. It goes without saying that other inductive or contactless couplings are also possible, for example with two ferrite rods. FIG. 4 shows an example of such a variant.

If an electrical galvanic connection is still selected, there is the possibility of making the hinged suspension with an antenna conductor wire wound in spiral form, so that the connection from the reading coil by means of the conductor acting as suspension is fixed at the top side and is taken from there to the receiver. Standard wire can advantageously be used for this conductor wire, in order to counteract the influence of parasitic capacities.

We claim:

1. An antenna system for interrogation and identification of a transponder, wherein the transponder moves along an interrogation path comprising:
   a frame antenna, having a top and a bottom portion, disposed around said interrogation path for interrogating said transponder moving along said interrogation path;
   a separate reading antenna for receiving an identification code signal from said transponder located with hinged suspension from said top portion of said frame antenna.

2. The antenna system according to claim 1, wherein said separate reading antenna is located approximately in the center of said top portion of said frame antenna.

3. The antenna system according to claim 1, wherein said hinged suspension is achieved through inductive coupling.

4. The antenna system according to claim 3, further comprising an interrogation station which comprises a transmit-receive unit for supplying an antenna control signal to said frame antenna and for receiving said identification code signal from said separate reading antenna.

5. The antenna system according to claim 4, wherein said inductive coupling is realized through a fixed coil connected to a conductor to said transmit-receive unit and a movable coil connected to a conductor to said reading antenna.

6. The antenna system according to claim 5, wherein said fixed coil is provided on a first pot core and said movable coil is provided on a second pot core, and wherein further said second pot core is rotatably relative to said first pot core.

7. The antenna system according to claim 5, wherein said fixed coil and said movable coil are provided on separate ferrite rods.

8. The antenna system according to claim 1, wherein said hinged suspension is realized through a loose spirally wound conductor such as standard wire.

9. The antenna system according to claim 1, wherein said hinged suspension is realized in a spring conductor.

* * * * *